(12) United States Patent
Letendre

(10) Patent No.: US 7,491,115 B2
(45) Date of Patent: Feb. 17, 2009

(54) INDEXING DEVICE FOR PERFORMING OPERATIONAL TASKS ON A TOOL ELEMENT

(76) Inventor: Michel Letendre, 2620 Cr. Bernini, Brossard, Quebec (CA) J4Z 2S2

( * ) Notice: Subject to any disclaimer, the term of this patent is extended or adjusted under 35 U.S.C. 154(b) by 0 days.

(21) Appl. No.: 11/939,072

(22) Filed: Nov. 13, 2007

(65) Prior Publication Data

US 2008/0105089 A1    May 8, 2008

Related U.S. Application Data

(63) Continuation of application No. 11/049,046, filed on Feb. 2, 2005, now abandoned.

(30) Foreign Application Priority Data

Feb. 23, 2004    (CA) .................................... 2458340

(51) Int. Cl.
B24B 49/00    (2006.01)
(52) U.S. Cl. .................... 451/11; 451/268; 451/293; 76/77; 76/37
(58) Field of Classification Search .................... 451/11, 451/16, 268, 293, 403; 76/37, 77
See application file for complete search history.

(56) References Cited

U.S. PATENT DOCUMENTS

| | | | |
|---|---|---|---|
| 1,769,016 A | 7/1930 | Cunningham et al. | |
| 2,436,004 A | 2/1948 | Hall | |
| 2,875,648 A | 3/1959 | Garrison | |
| 2,959,989 A | 11/1960 | Ebert | |
| 3,903,760 A | 9/1975 | Jones | |
| 4,102,224 A | 7/1978 | Wright | |
| 4,331,047 A | 5/1982 | English | |
| 4,357,841 A | 11/1982 | Mote | |
| 4,434,683 A | 3/1984 | Kaye | |
| 4,819,515 A | 4/1989 | Pfaltzgraff | |
| 5,038,639 A | 8/1991 | Emter | |
| 5,295,418 A | 3/1994 | Emter | |
| 5,759,092 A | 6/1998 | Liu | |
| 6,109,137 A * | 8/2000 | Lenard et al. | 451/9 |

\* cited by examiner

*Primary Examiner*—Maurina Rachuba

(57) ABSTRACT

An indexing device for successively positioning a tool element relative to an apparatus adapted to perform a series of operational tasks on said tool element comprises a base, a reciprocally movable support mounted on the base, a fixing member adjustably mounted on the support for fixing the tool element thereto, a pivotable arm mounted to the base and extending between the support and the apparatus, an indexing abutment mounted on the arm and positioned thereon to contact a part of the tool element. The support is moved in a first direction to bring the tool element in a task performing position with the apparatus. The movable support has a pusher to contact the arm and to cause pivotal movement of the arm when the support is moved in this first direction whereby the arm and the abutment are moved away from the task performing position. Thereafter, the arm is returned to a subsequent task performing position when the support is moved in a second direction opposite the first direction.

6 Claims, 6 Drawing Sheets

INDEXING DEVICE FOR PERFORMING OPERATIONAL TASKS ON A TOOL ELEMENT

FIELD OF THE INVENTION

The present invention relates to an indexing device for successively positioning a tool element relative to an apparatus adapted to perform a series of operational tasks on the tool element.

In particular, the present invention relates to an indexing device for successively positioning a saw blade relative to an apparatus adapted to perform a series of tooth grinding tasks on the saw blade teeth.

BACKGROUND OF THE INVENTION

Bench saw operators are dependent upon outside sources in order to perform certain operations, such as the resharpening of their saw blades. This situation generally entails that the operators hold up their decision on taking their blades out for resharpening so that they may keep up with production. This has a direct impact on the quality of the work performed, as well as on the pleasure of doing it.

Furthermore, the useful life of a saw blade drops dramatically when re-sharpening is unduly delayed, which translates into an economically harmful factor.

Existing saw blade resharpening machines are stable and heavy because of the high precision and severe work duty associated with the resharpening process. These machines are therefore expensive and require a significant floor space area.

Also, existing circular saw blade sharpening machines require a rather complex indexing mechanism to precisely position the blade teeth prior for them to be moved towards the grinding wheel for adequate material removal.

Existing indexing mechanisms on most grinding machines use a moving element which makes contact with the face of the tooth to be ground, and displaces it very precisely where it should be for the grinding wheel to move in and remove a pre-determined amount of material (usually a few thousands of an inch).

In view of the fact that the moving element makes contact with the face of the tooth, as a starting reference, the moving distance has to be established according to a mathematical formula based on the saw blade diameter and the total number of teeth, before it is preset.

However, if a saw blade to be resharpened has a slightly damaged tooth (often the case), the preset moving distance of the moving element is no longer appropriate, and the situation could be dramatic in a sense that the expensive diamond grinding wheel could be destroyed.

Most existing resharpening machines use this moving element concept advantageously in an automatic mode. However, because of its relative complexity, it is not appropriate for a manual and user friendly operation.

OBJECTS AND STATEMENT OF THE INVENTION

It is therefore an object of the present invention to provide a user friendly indexing device for successively positioning a tool element relative to an apparatus adapted to perform a series of operational tasks on the tool element.

The indexing device comprises:
a base;
a reciprocally movable support mounted on the base;
a fixing member adjustably mounted on the support for fixing the tool element thereto;
a pivotable arm mounted to the base and extending between the support and the apparatus;
an indexing abutment mounted on the arm and positioned thereon to contact a part of the tool element;
means allowing the support to move in a first direction to bring the tool element in a task performing position with the apparatus;
the movable support having pusher means to contact the arm and to cause pivotal movement of the arm when the support is moved in the first direction whereby the arm and the abutment are moved away from the task performing position; and
means for returning the arm to a subsequent task performing position when the support is moved in a second direction opposite the first direction.

In a preferred form, the present invention is to provide an indexing device for successively positioning a saw blade relative to an apparatus adapted to perform a series of tooth grinding tasks on the saw blade.

The indexing mechanism of the present invention is much simpler and easier to operate by anyone using a manually operated grinding machine than that which exists at present.

There is no indexing adjustment required, regardless the blade diameter or the number of teeth (the amount of material to be removed or ground is factory preset).

In the case of a slightly damaged tooth, it can be repaired by going in with successive passes until it recovers its sharp edges characteristics again.

Another advantage of the design of the present invention is that the indexing abutment is moved away ahead and slightly behind the grinding wheel, at a faster speed than that of the blade due to the geometry of the arm and pivot shaft on the forward stroke of its feed lever. The abutment is automatically returned to its previous position on the return stroke of the feed lever with the help of a tension spring force.

A button head type bolt is a most convenient way to move the abutment away and to repeatedly position the abutment at the end of the return lever stroke as well as to accommodate for the complex relative sliding movement between the abutment arm and the movable support, as well as to stop the displacement of the movable support on its return stroke.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art

DESCRIPTION OF A PREFERRED EMBODIMENT

Figure 1:
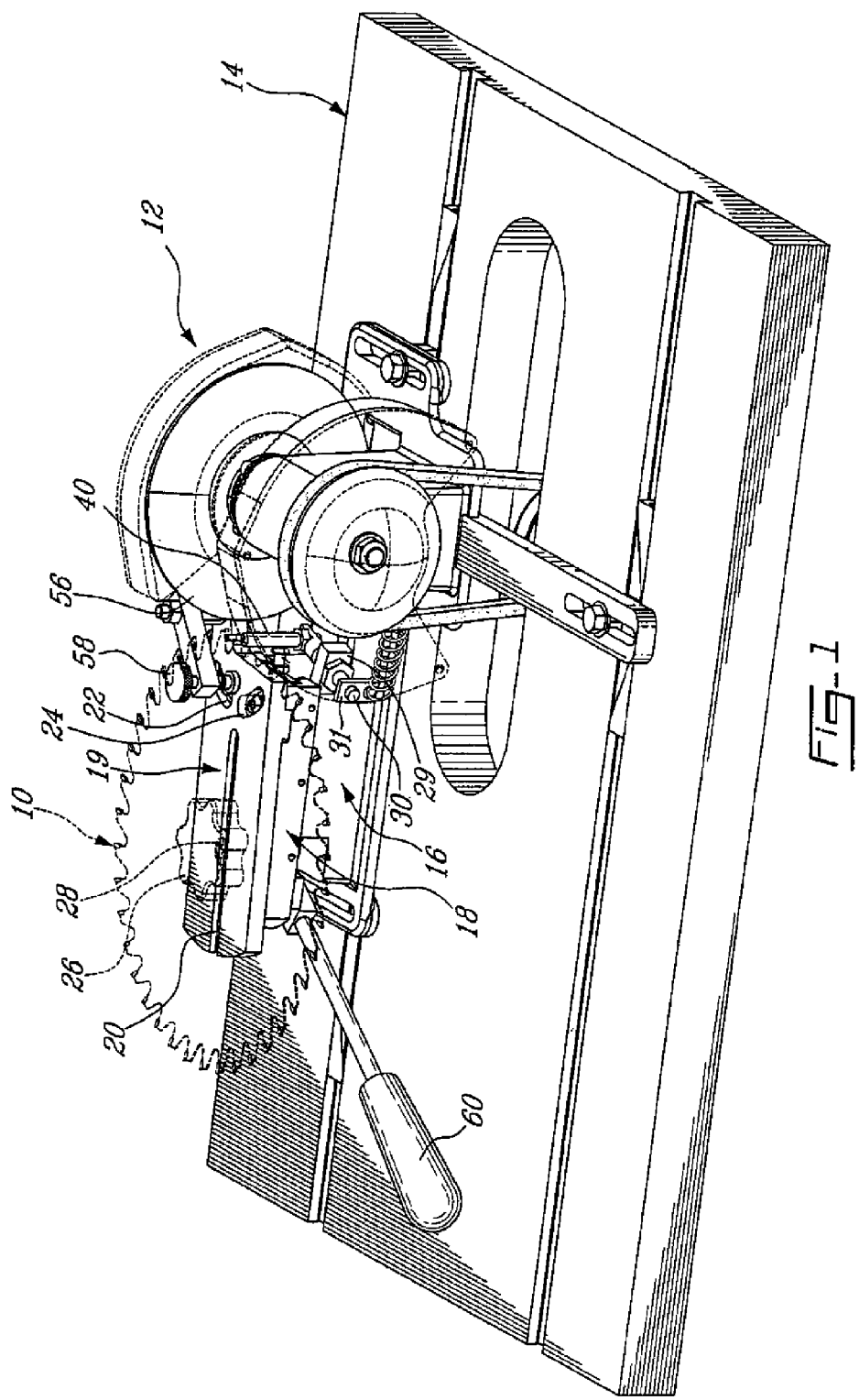
FIG. 1 is a top perspective view of an indexing device made in accordance with the present invention when used in a blade grinding operation.

FIG. 1 shows the present invention used in the successive positioning of the teeth of a blade 10 relative to a blade grinding apparatus 12. However, the present invention should not be limited to this particular function. Hence, in a broader sense, the invention concerns an indexing device for successively positioning a tool element to an apparatus adapted to perform a series of operational tasks on the tool element.

Also, in FIG. 1, a table 14, which may be the top surface of a conventional bench saw, is particularly configured to enable the operation of the blade grinding apparatus 12. However, a detailed description of this configuration is not essential for the understanding of the present invention; on the other hand, such mounting can be found in applicant's co-pending U.S. patent application Ser. No. 10/695,598 filed Oct. 28, 2003.

Figure 2:
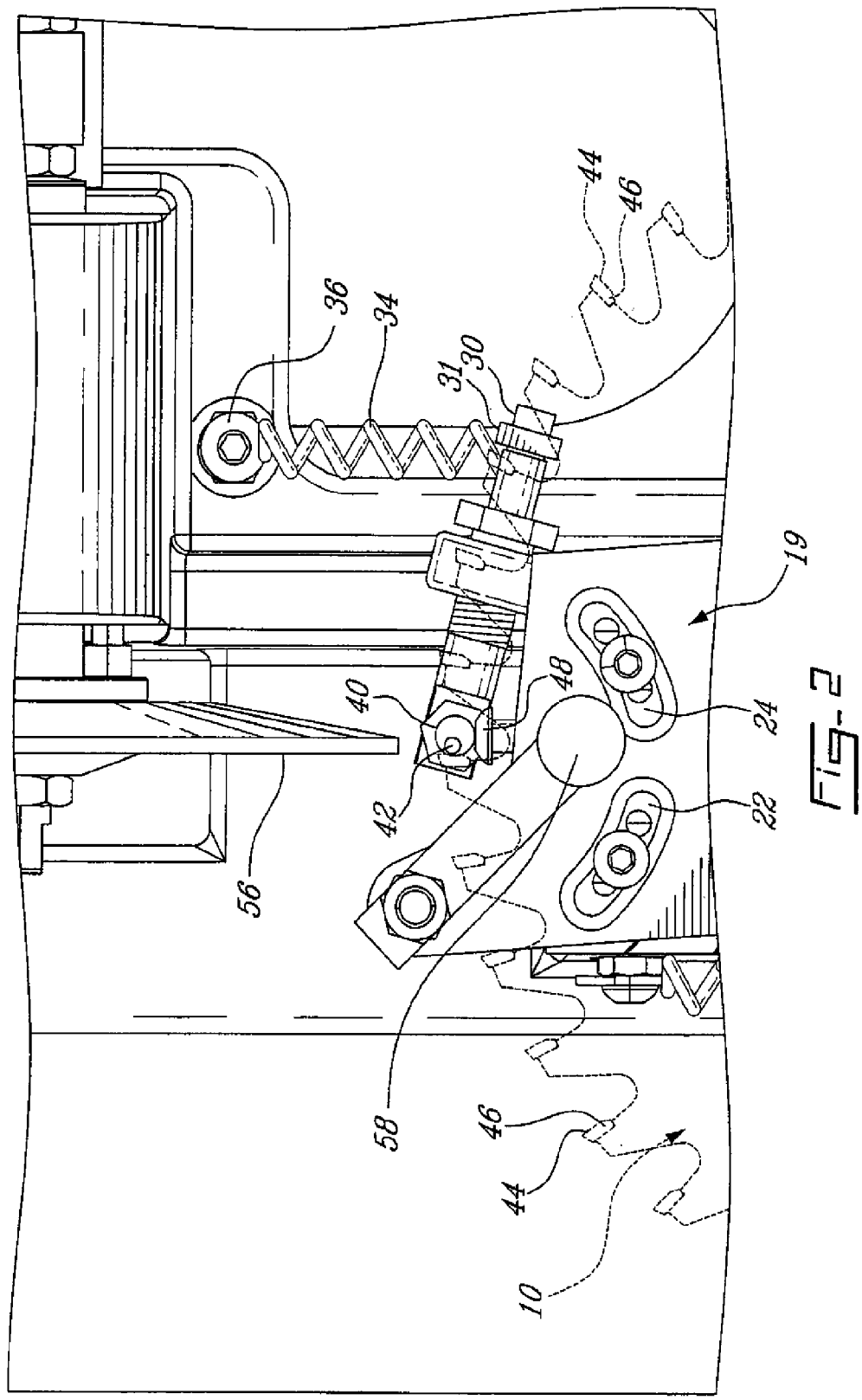
FIG. 2 is an enlarged top view of part of the indexing device.

Referring also to FIG. 2, the indexing device of the present invention comprises a base 16 on which is mounted a reciprocally moveable support 18, to which is mounted a fixing plate 19 displaying a longitudinal slot 20 and a pair of arcuate slots 22 and 24. A fixing knob 26, provided with a stem (not shown) extending through the center opening 28 of the blade 10 and received into the slot 20, serves to fix the blade 10 to the support member 19.

Figure 3:
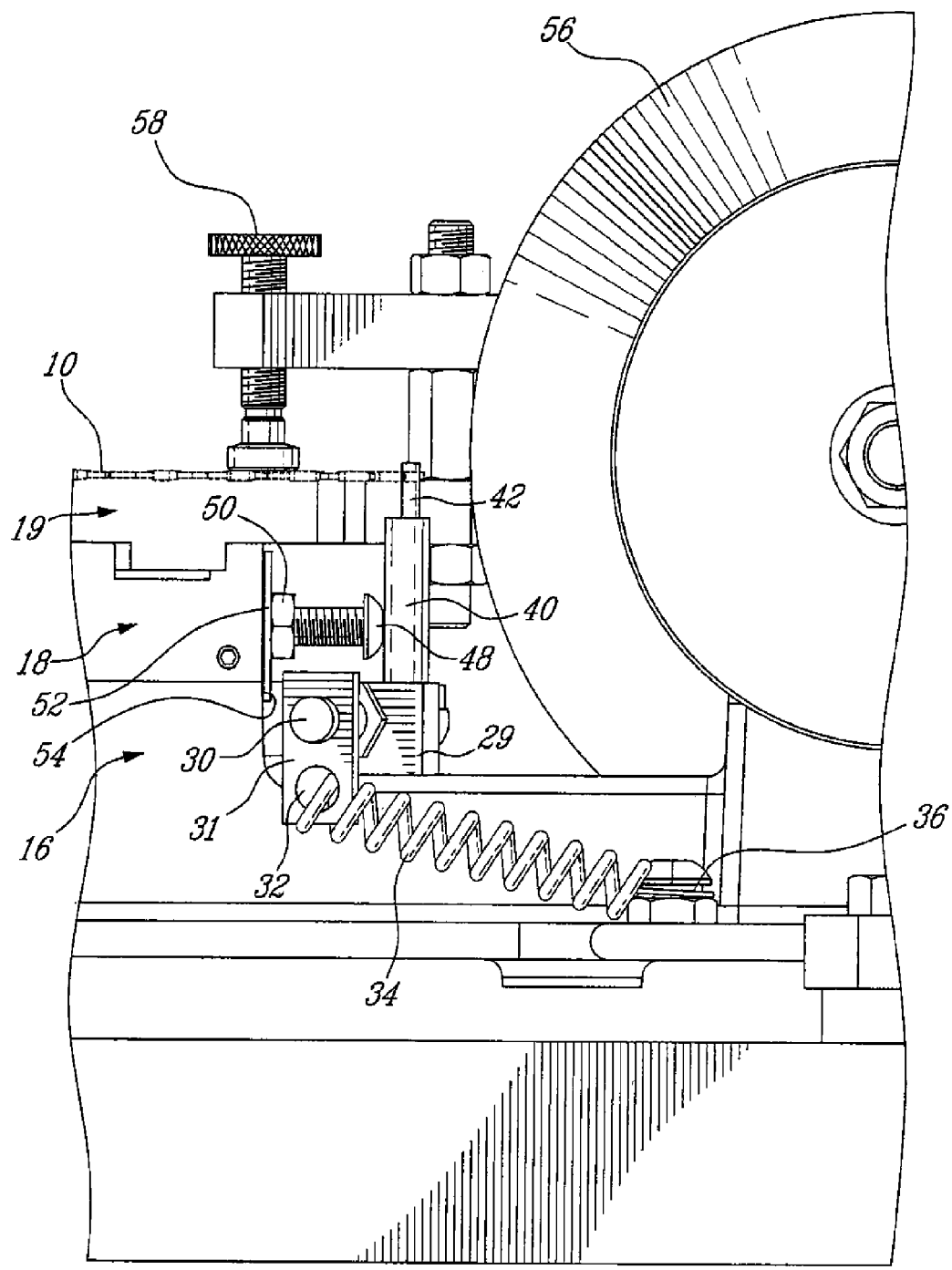
FIG. 3 is an enlarged elevational view of part of the indexing device.

Referring additionally to FIG. 3, to the front end of the base 16 is fixed a bracket 29 supporting a pivot shaft 30. A pivot lever 31 is fixedly mounted to the pivot shaft 30 and has its lower end 32 adapted to receive one end of a spring 34 (the function of which will be described later). The opposite end of the spring 34 is connected to the base at 36. The pivot shaft 30 extends horizontally and obliquely relative to the base and supports, at its opposite end, a perpendicular extending arm 40. The top face of arm 40 bears an indexing abutment 42. As can be seen, in FIG. 2, the indexing abutment 42 is adapted to contact face 44 of a blade tooth 46 of the blade 10.

The movable support 18 displays, at its front end, a pushing member 48, adjustably screwed and locked with lock nut 50. A large washer 52 is also simultaneously locked, between nut 50 and the front end of movable support 18. Washer 52 acts as a stopper, as it contacts the front face 54 of base 16, on the return stroke of movable support 18, for precise and repetitive positioning of abutment 42, in preparation for the correct positioning of the subsequent tooth to be ground.

Pushing member 48 is adapted to contact the arm 40 and to cause it to pivot about the axis of shaft 30. As can be seen in FIG. 2, the actuation of the pushing member 48 causes the arm 40 and its abutment 42 to move to the right and to clear the grinding wheel 56, due to the angular positioning of shaft 30. As can be seen in FIG. 3, the abutment 42 will always move at a faster speed than the speed of the movable support 18, because the abutment 42 is located on a longer radius.

Figure 4:
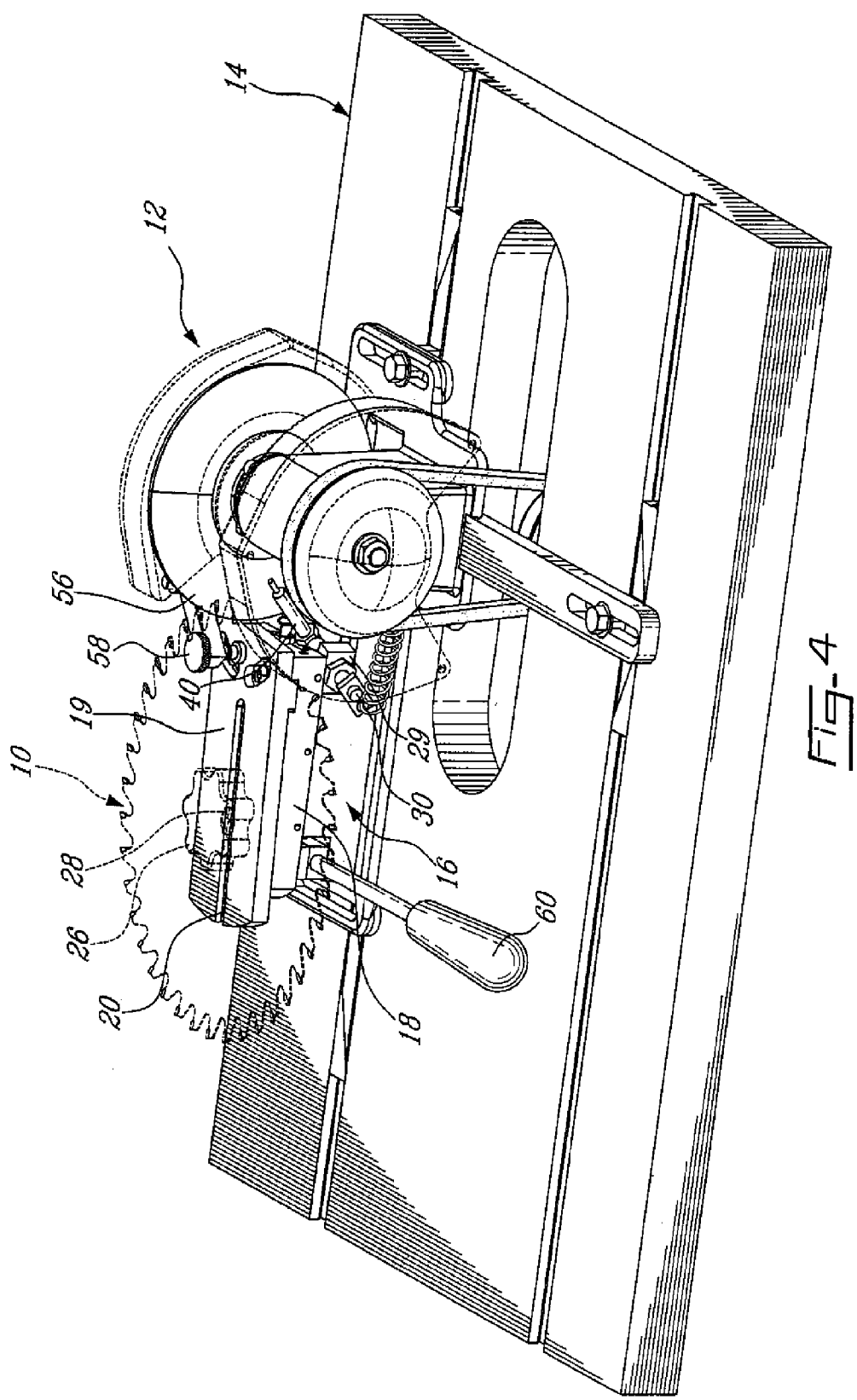
FIG. 4 is a top perspective view similar to FIG. 1 but showing the indexing device in a non-indexing position.
Figure 5:
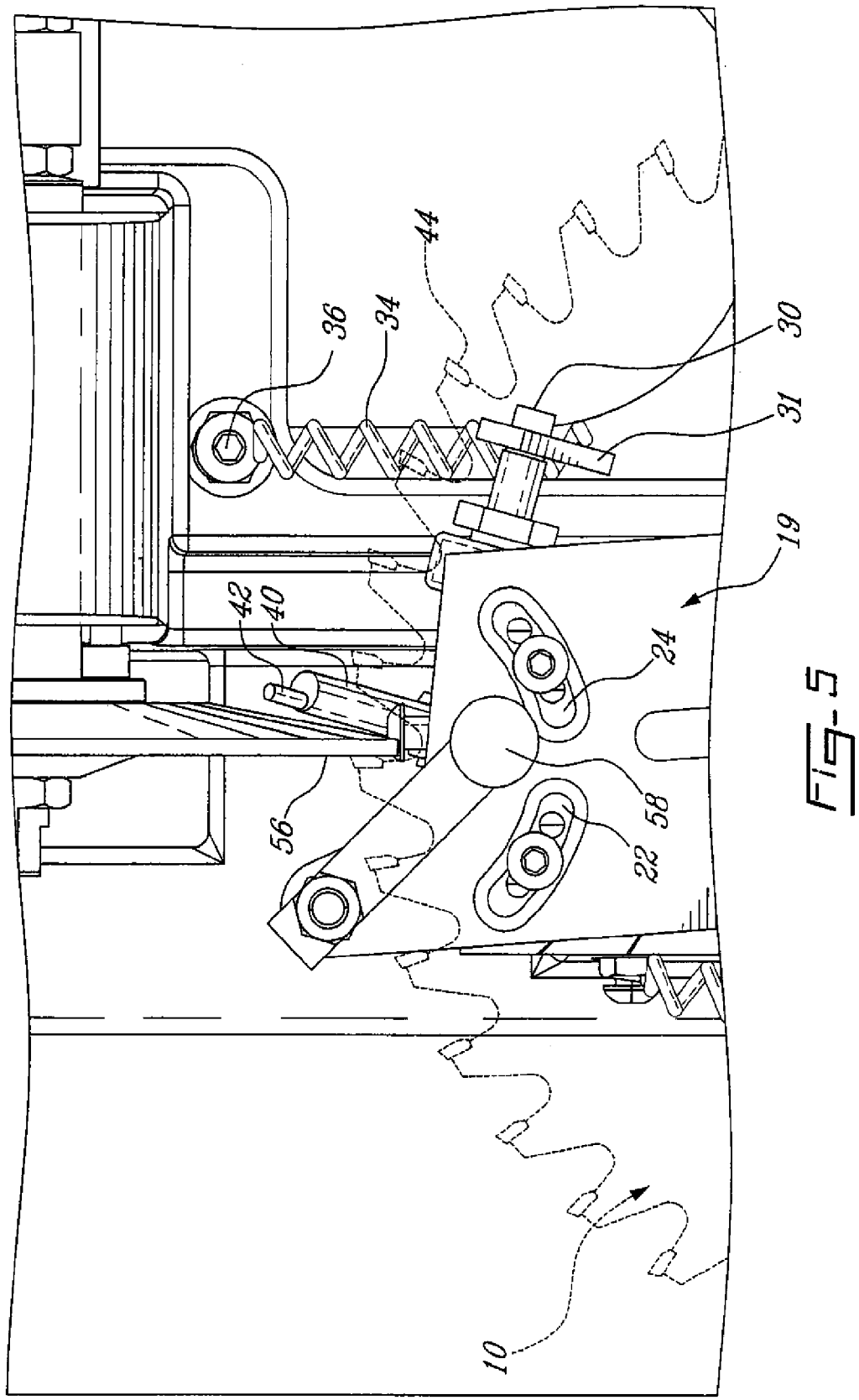
FIG. 5 is an enlarged top view of part of that shown in FIG. 4.
Figure 6:
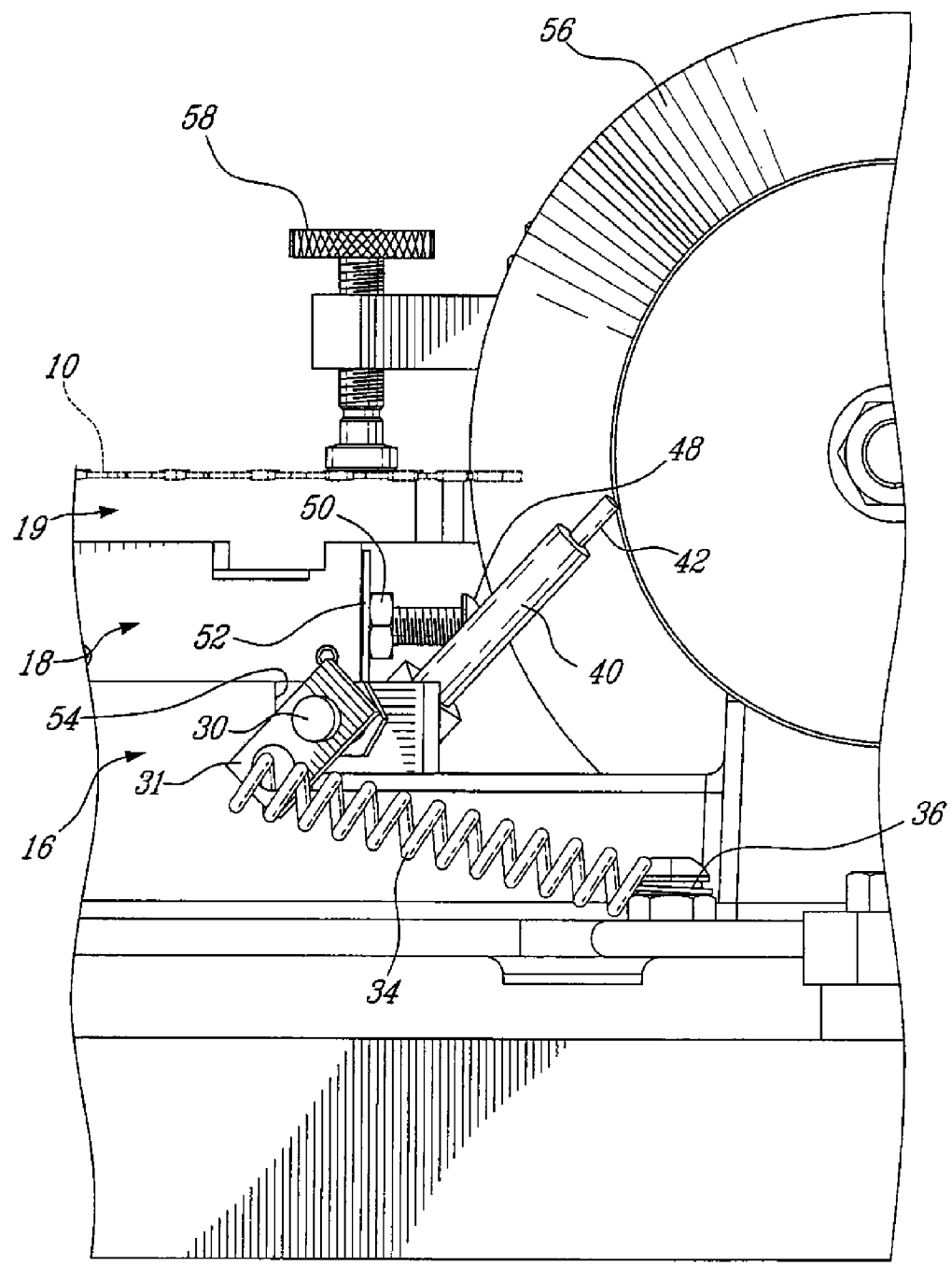
FIG. 6 is an enlarged elevational view of part of that shown in FIG. 4.

Hence, as illustrated in the drawings and with reference to the particular embodiment of the present invention used in association with a saw blade resharpening apparatus, the abutment 42 serves to properly contact and position a saw blade tooth to be ground (the saw blade is rotated manually until the tooth to be ground touches abutment 42) with respect to the grinding wheel 56. Once this is achieved, an overhead securing member 58 is manually screwed to contact the blade 10 so that the grinding operation may begin without vibration. By actuating a lever 60 connected to the movable support 18, pusher 48 causes the arm and its abutment 42 to be angularly pivoted (such as shown in FIGS. 4, 5 and 6) with respect to the axis of the grinding wheel 56. Once the grinding operation is terminated for one blade tooth and during the return stroke of the lever 60, while spring 34 causes the shaft 30 to pivot back and the arm 40 to return to its initial position, the overhead securing member 58 is manually loosened and the saw blade rotated manually by one tooth, before the abutment 42 reaches its final position again, at which time the adjacent tooth can be brought to contact it, in preparation for the next sequence.

The pushing member 48 has a frusto-spherical shape which is required as a result of the relative and complex movement between the support 18 and the arm 40.

Although the invention has been described above with respect to one form, it will be evident to the person skilled in the art that it may be varied and refined for similar operational task. It should therefore be understood that the present invention should not be limited in interpretation, except by the terms of the following claims.

The invention claimed is:

1. An indexing device for successively positioning a tool element relative to an apparatus adapted to perform a series of operational tasks on said tool element, comprising:
   a base;
   a movable support mounted on said base and reciprocally displaceable along an axis of displacement;
   a fixing member adjustably mounted on said support for fixing said tool element thereto;
   a pivotable arm mounted to a horizontal pivot shaft fixed on said base and extending obliquely relative to the axis of displacement of said support and directly between said support and said apparatus;
   an indexing abutment mounted on said arm and positioned thereof to contact a part of said tool element;
   means allowing said support to move in a first direction along said axis to bring said tool element into a task performing position with said apparatus;
   said movable support having a pushing member extending therefrom, the pushing member having a frusto-spherical shaped head in direct contact with said arm;
   said pushing member being moved by said movable support in said first direction and causing pivotal movement of said arm when said support is moved in said first direction whereby said indexing abutment mounted on said arm is pivotally moved out of contact with said part of said tool element and clear of said tool element prior to and during said task performing operation; and
   means for returning said arm to a subsequent task performing position when said support is moved in a second direction opposite to said first direction.

2. An indexing device as defined in claim 1, wherein said pushing member contacts said arm at a location to cause greater displacement of said abutment than that of said support.

3. An indexing device as defined in claim 2, wherein said indexing abutment moves away and towards the movable support at a speed greater than the speed of said movable support.

4. An indexing device as defined in claim 1, wherein said arm is mounted to said base by means of a pivotal link and wherein said returning means consists of a spring having one end connected to said link and an opposite end connected to said base.

5. An indexing device as defined in claim 1, farther comprising means for fixing said tool element to said fixing member.

6. An indexing device for successively positioning a saw blade relative to an apparatus adapted to perform a series of tooth grinding tasks on said blade, comprising:
- a base;
- a movable support mounted on said base and reciprocally displaceable along an axis of displacement;
- a fixing member adjustably mounted on said support for fixing said blade thereto;
- a pivotable arm mounted to a horizontal pivot shaft fixed on said base and extending obliquely relative to the axis of displacement of said support and directly between said support and said grinding apparatus;
- an indexing abutment mounted on said arm and positioned thereon to successively contact teeth of said blade;
- means allowing said support to move in a first direction along said axis to bring said blade into a tooth grinding position with said apparatus;
- said movable support having a pushing member extending therefrom, the pushing member having a frusto-spherical shaped head in direct contact with said arm;
- said pushing member being moved by said movable support in said first direction and causing pivotal movement on said arm when said support is moved in said first direction whereby said indexing abutment mounted on said arm is pivotally moved out of contact with said teeth of said saw blade and clear of said saw blade prior to and during said grinding operation; and
- means for returning said arm to a subsequent tooth grinding position when said support is moved in a second direction opposite said first direction.

* * * * *